(12) United States Patent
Bridgford

(10) Patent No.: US 7,958,394 B1
(45) Date of Patent: Jun. 7, 2011

(54) METHOD OF VERIFYING A TRIPLE MODULE REDUNDANT SYSTEM

(75) Inventor: Brendan K. Bridgford, Vienna, VA (US)

(73) Assignee: Xilinx, Inc., San Jose, CA (US)

( * ) Notice: Subject to any disclaimer, the term of this patent is extended or adjusted under 35 U.S.C. 154(b) by 384 days.

(21) Appl. No.: 11/732,782

(22) Filed: Apr. 4, 2007

(51) Int. Cl.
 *G06F 11/00* (2006.01)
(52) U.S. Cl. .............................. 714/25; 714/11; 714/37
(58) Field of Classification Search .............. 714/1–57, 714/725, 797, 822, 2, 11, 25, 37, 47, 48; 395/500.34, 725, 182.03, 182.09; 361/78; 341/155, 184.01; 257/369; 364/200; 716/6
See application file for complete search history.

(56) References Cited

U.S. PATENT DOCUMENTS

| | | | | |
|---|---|---|---|---|
| 4,621,201 A | * | 11/1986 | Amdahl et al. ................. | 326/11 |
| 4,683,570 A | * | 7/1987 | Bedard et al. ................. | 714/797 |
| 5,923,512 A | * | 7/1999 | Brownlow et al. ............... | 361/78 |
| 6,023,230 A | * | 2/2000 | Dorenbosch et al. ......... | 340/7.24 |
| 6,160,413 A | * | 12/2000 | Habersetzer et al. ......... | 324/763 |
| 7,383,479 B1 | * | 6/2008 | Carmichael et al. .......... | 714/725 |
| 2002/0108076 A1 | * | 8/2002 | Barenys et al. .................. | 714/43 |

OTHER PUBLICATIONS

Xilinx, Inc., "TMRTool User Guide", (TMRTool Software V6.2.03i), UG156, Sep. 30, 2004, pp. 1-80, v1.0, available from Xilinx, Inc., 2100 Logic Drive, San Jose, CA 95124.

* cited by examiner

*Primary Examiner* — Scott T Baderman
*Assistant Examiner* — Sarai Butler
(74) *Attorney, Agent, or Firm* — John J. King

(57) ABSTRACT

A method of verifying a triple module redundant circuit. The method comprises providing three circuits, each comprising a redundant circuit; coupling a feedback voter circuit at the output of each circuit of the three circuits, each feedback voter receiving the output of each of the three circuits; disabling a first circuit of the three circuits; enabling the first circuit; disabling a second circuit of the three circuits; and verifying the output of the triple module redundant design to determine whether an error has occurred. A article of manufacture for verifying a design implemented as a triple redundancy module is also described.

20 Claims, 4 Drawing Sheets

METHOD OF VERIFYING A TRIPLE MODULE REDUNDANT SYSTEM

FIELD OF THE INVENTION

The present invention relates generally to triple module redundant designs, and in particular, to a method of and system for verifying a design implemented as a triple module redundant design.

BACKGROUND

A programmable logic device (PLD) is designed to be user-programmable so that users may implement logic designs of their choice. Programmable logic circuits of a PLD comprise gates that are configurable by a user of the circuit to implement a circuit design of the user. One type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. In some CPLDs, configuration data is stored on-chip in non-volatile memory, then downloaded to volatile memory as part of an initial configuration sequence.

Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both CPLDs and FPGAs, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., FLASH memory, as in some CPLDs), or in any other type of memory cell.

PLDs also have different "modes" depending on the operations being performed on them. A specific protocol allows a programmable logic device to enter into the appropriate mode. Typical PLDs have internal blocks of configuration memory that specify how each of the programmable cells will emulate the user's logic. During a "program" mode, a configuration bitstream is provided to non-volatile memory, such as a read-only memory (ROM) (e.g., a programmable ROM (PROM), an erasable PROM (EPROM), or an electrically erasable PROM (EEPROM)) either external or internal to the programmable logic device. Each address is typically accessed by specifying its row and column addresses. During system power up of a "startup" mode, the configuration bits are successively loaded from the non-volatile memory into static random access memory (SRAM) configuration latches of a configuration logic block.

However, for a PLD to function properly, it is necessary that the data loaded into a memory is not corrupted. Certain applications of programmable logic devices, such as military, aerospace, and high-reliability communications, must be able to continue operating in the presence of a small number of configuration bit errors even when the likelihood of such an occurrence is extremely low. A Single Event Upset (SEU) relates to a configuration bit flip due to cosmic radiation, for example, while a Single Event Transient (SET) is a transient voltage pulse on routing resources that may be large enough to cause logic level upsets. Triple module redundancy (TMR) is a technique for ensuring that a circuit functions even if one of the circuits is not operating properly, where a majority vote of the remaining two circuits will ensure that the output of the circuit is correct. If an SEU or SET upsets a state machine, the state machine will resynchronize with its redundant partners after the upset is corrected through configuration memory scrubbing. Therefore, state logic can operate uninterrupted in the presence of SEUs and SETS.

However, implementing a circuit in triple module redundancy can be a difficult task. Therefore, verifying that a circuit implemented using triple module redundancy operates correctly is important. TMR circuits are typically verified through simulation. Conventional methods for simulating TMR designs involve running the simulation of the three redundant circuits normally, then "breaking" one design domain by tying the clock signal coupled to the design domain to ground. If the circuit behaves correctly, this shows that redundant circuitry is working correctly. Next, the clock signal to another design domain is tied to ground, causing the circuit to stop functioning. This is repeated for each redundant circuit. It is expected that the output will be correct after the first clock domain is broken, but that the output will be incorrect after the second clock domain is broken during this test. However, the deficiency with this conventional method is that it will not reveal missing or incorrectly connected feedback voters. That is, the simulation will give the same result regardless of whether feedback voters are present or not, since the feedback voters serve to synchronize state logic after the error condition has been corrected. Accordingly, conventional methods for verifying a circuit implemented in triple module redundancy only show whether the overall design redundancy and the final stage of output voters are correctly implemented.

Accordingly, there is a need for an improved method of and system for verifying a design implemented in triple module redundancy.

SUMMARY

A method of verifying a TMR design is described. The method comprises providing three circuits, each comprising a redundant circuit; coupling a feedback voter circuit to an output of each circuit of the three circuits, each feedback voter receiving the output of each of the three circuits; disabling a first circuit of the three circuits; enabling the first circuit; disabling a second circuit of the three circuits; and checking the output of the TMR system to determine whether an error has occurred. The method may comprise determining whether there is a defect in each of the three feedback voter circuits, including whether a given feedback voter exists.

According to an alternate embodiment, the method of verifying a design implemented as a triple module redundant design comprises coupling a feedback voter circuit to an output of each circuit of three circuits comprising redundant circuits, each feedback voter receiving the output of each of the three circuits; disabling a first circuit of the three circuits; enabling the first circuit; disabling a second circuit of the three circuits; coupling the output of the feedback voters circuits to an output voter; comparing the output of the output voter coupled to known valid data; and verifying the output of the triple module redundant design to determine whether there is a defect in the first feedback voter circuit. The method may further comprise disabling the first circuit of the three circuits by disabling the clock signal to the first circuit. The method may also comprise providing a fourth redundant circuit generating the known valid data.

An article of manufacture verifying a design implemented as a triple module redundant design is also described. The article of manufacture comprises code for providing three circuits, each comprising a redundant circuit; code for coupling a feedback voter circuit to an output of each circuit of the three circuits, each feedback voter receiving the output of each of the three circuits; code for disabling a first circuit of the three circuits; code for repairing the first circuit using a feedback voter circuit at the output of the first circuit; code for disabling a second circuit of the three circuits; and code for verifying the output of the triple module redundant design to determine whether an error has occurred. The article of manufacture may further comprise code for generating a majority vote of the outputs of the feedback voter circuits.

DETAILED DESCRIPTION OF THE DRAWINGS

Figure 1:
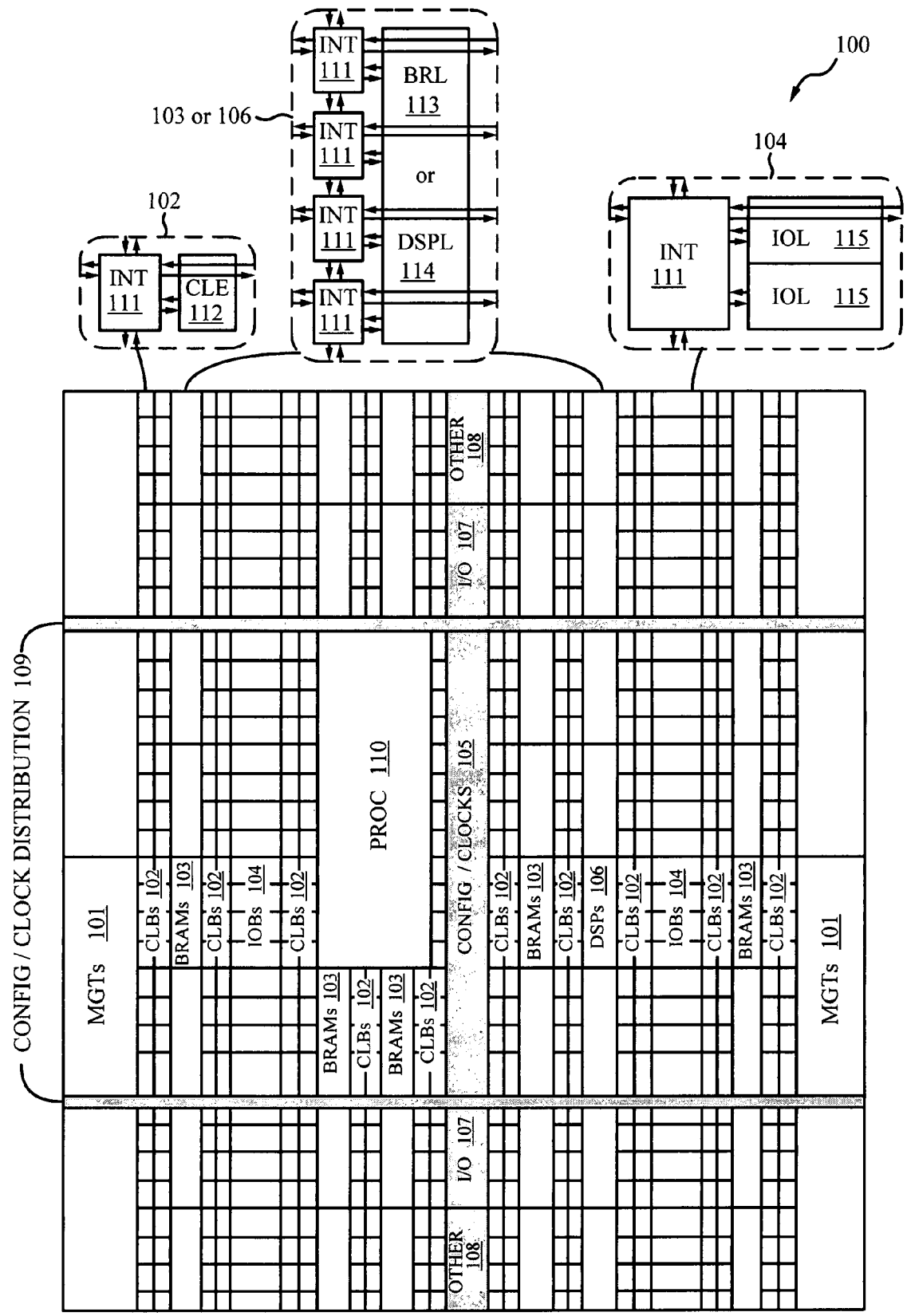
FIG. 1 is a block diagram of a programmable logic device that can be used, for example, to implement an embodiment the present invention.

Turning first to FIG. 1, a block diagram of a programmable logic device that can be used to implement an embodiment of the present invention is shown. The FPGA architecture 100 of FIG. 1 includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 may include a configurable logic element (CLE 112) that may be programmed to implement user logic plus a single programmable interconnect element (INT 111). A BRAM 103 may include a BRAM logic element (BRL 113) in addition to one or more programmable interconnect elements. The BRAM comprises dedicated memory separate from the distributed RAM of a configuration logic block. Typically, the number of interconnect elements included in a tile depends on the height of the tile. In the pictured embodiment, a BRAM tile has the same height as four CLBs, but other numbers (e.g., five) may also be used. A DSP tile 106 may include a DSP logic element (DSPL 114) in addition to an appropriate number of programmable interconnect elements. An IOB 104 may include, for example, two instances of an input/output logic element (IOL 115) in addition to one instance of the programmable interconnect element (INT 111).

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA. Some FPGAs utilizing the architecture illustrated in FIG. 1 include additional logic blocks that disrupt the regular columnar structure making up a large part of the FPGA. The additional logic blocks may be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic. While an FPGA is shown in detail as one type of programmable logic device by way of example, the circuits and methods of the present invention may be implemented in any device, including any type of integrated circuit having programmable logic.

Figure 2:
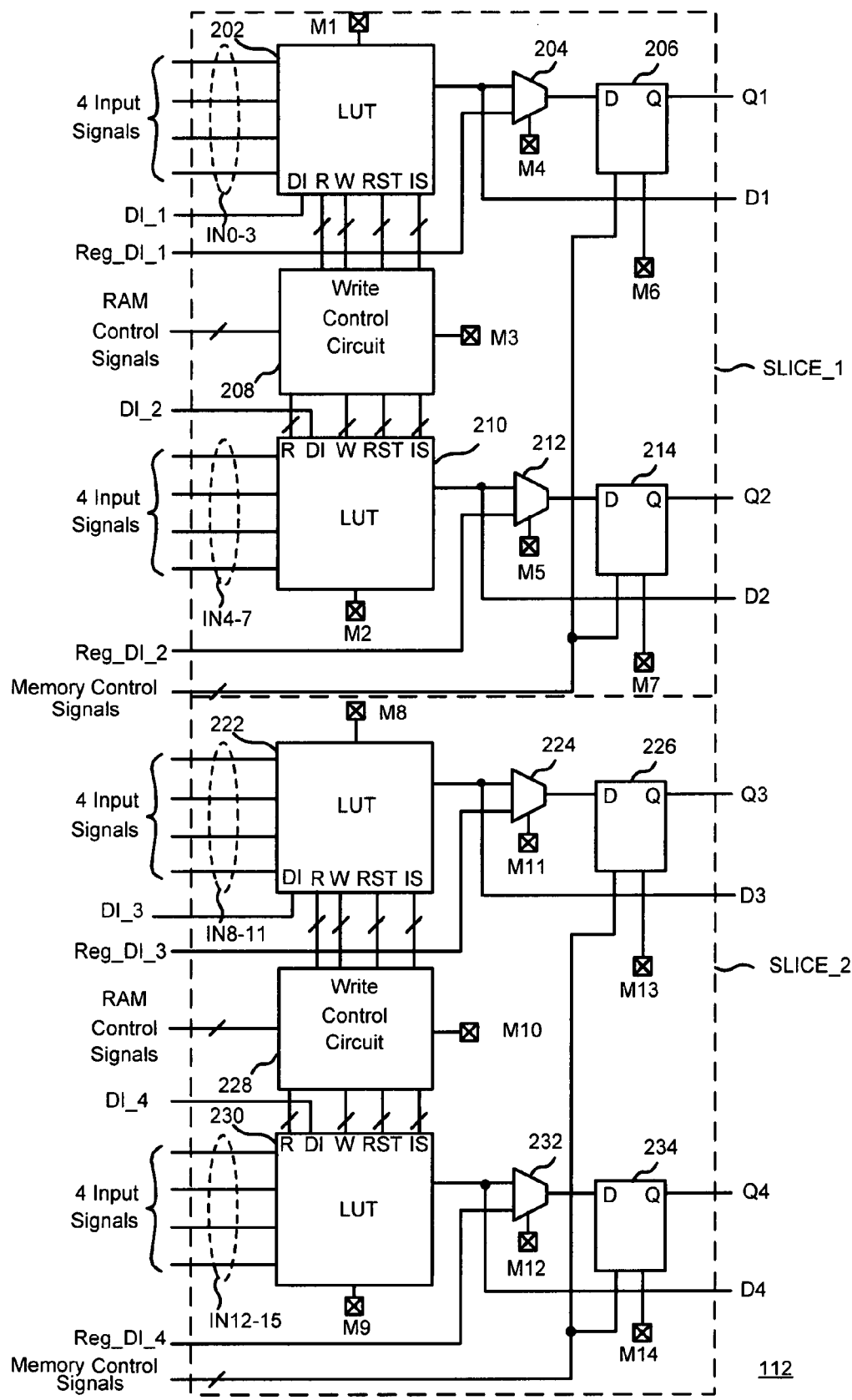
FIG. 2 is a block diagram of a configurable logic element of the programmable logic device of the circuit of FIG. 1 that can be used, for example, to implement an embodiment of the present invention.

Turning now to FIG. 2, a block diagram of a configurable logic element of the programmable logic device of the circuit of FIG. 1 that can be used to implement an embodiment of the present invention is shown. In particular, FIG. 2 illustrates in simplified form a configurable logic element 112 of a configuration logic block 102 of FIG. 1. The configurable logic element shown comprises two similar slices, where each slice comprises a pair of function generators. However, the configurable logic element may comprise more slices, such as four slices, for example. Each function generator may function in any of several modes depending upon the configuration data in the configuration memory elements M1-M14. When in RAM mode, input data is supplied by an input terminal DI_1, DI_2 to the data input (DI) terminal of the associated function generator. Each function generator provides an output signal to an associated multiplexer, which selects between the output signal function generator and an associated register direct input signal Reg_DI_1, Reg_DI_2 from the programmable interconnect element. Thus, each function generator may be optionally bypassed. When in look-up table mode, each function generator implemented as a look-up table has four data input signals IN0-IN3. Slice 1 comprises a function generator implemented as a LUT 202 coupled to a multiplexer 204. In particular, the LUT 202 receives 4 input signals that are decoded to generate an output associated with data stored in the LUT at the address designated by the input signals. The multiplexer 204 is adapted to receive the output D1 of LUT 202 and a registered value of Reg_DI_1. The output of the multiplexer 204 is coupled to a register 206 which generates an output Q1.

A Write Control Circuit 208 is coupled to receive RAM control signals and generate signals to control the LUT 202. In addition to a data input (DI) coupled to receive DI_1 and conventional read and write control signals coupled to a read enable input (R) and a write enable input (W), the LUT 202 comprises a partial reset input (RST) for receiving a partial reset signal, and an initial state input (IS) for receiving an initial state signal. Such resetting of the memory elements enables resetting the LUT memory cells during a partial reconfiguration of a programmable logic device, including partial reconfiguration of a device during operation. Similarly, slice 1 comprises a function generator implemented as a LUT 210 coupled to a multiplexer 212. The LUT 210 is adapted to receive input signals IN4-IN7, while the multiplexer 212 is coupled to receive the output D2 of the LUT 210 and a registered value of Reg_DI_2. The output of the multiplexer 212 is coupled to a register 214 which generates an output Q2. The write control circuit 208 also generates a partial reset signal and an initial state signal for selectively resetting or setting one or more of the bits of the LUT 210. One advantage of resetting LUT memory elements of a device during partial reconfiguration is that it is not necessary to cycle through the required clock cycles to set the correct data after the partial reconfiguration.

Similarly, slice 2 comprises a function generator implemented as a LUT 222 coupled to a multiplexer 224. The LUT 222 is adapted to receive input signals IN8-IN11, while the multiplexer 224 is coupled to receive the output D3 of the LUT 222 and a registered value of Reg_DI_3. The output of the multiplexer 224 is coupled to a register 226 which generates an output Q3. A Write Control Circuit 228 is coupled to receive RAM control signals and generate signals to control the LUT 222. In particular, input signals IN8-IN11 are decoded to generate an output associated with data stored in the LUT at the address designated by the input signals. The LUT 222 comprises a partial reset input (RST) for receiving a partial reset signal, and an initial state input (IS) for receiving an initial state signal. Similarly, slice 2 comprises a function generator implemented as a LUT 230 coupled to a multiplexer 232. The LUT 230 is adapted to receive input signals IN12-IN15, while the multiplexer 232 is coupled to receive the output D4 of the LUT 230 and a registered value of Reg_DI_4. The output of the multiplexer 232 is coupled to a register 234 which generates an output Q4. The write control circuit 228 also generates a partial reset signal and an initial state signal for selectively resetting or setting one or more of the bits of the LUT 230.

Figure 3:
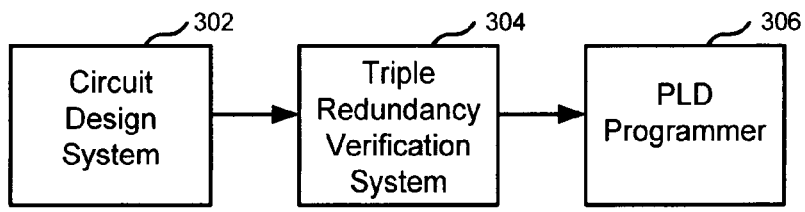
FIG. 3 is a block diagram of a system for implementing a programmable logic device according to an embodiment of the present invention.

Turning now to FIG. 3, a block diagram of a system 300 for implementing a programmable logic device according to an embodiment of the present invention is shown. In particular, a circuit is designed using circuit design system 302, which may comprise circuit design software running on a computer. For example, a single-string (non-TMR) circuit may be designed using ISE Foundation software available from Xilinx, Inc. of San Jose, Calif. The circuit design may then be converted to a TMR system using TMRTool software also available from Xilinx, Inc. The circuit design may then be verified by a triple redundancy verification system 304. The triple redundancy verification system 304 may be implemented on a computer that simulates the circuit design generated by the circuit design system 302, for example. Specific implementations of the triple redundancy verification system 304 will be described in more detail below in reference to FIGS. 4 and 5, while a method of verifying a triple redundancy module will be described in more detail in reference to FIG. 6. Finally, the circuit design may then be implemented as a triple module redundant design in a programmable logic device by a PLD programmer 306, as is well known in the art.

Figure 4:
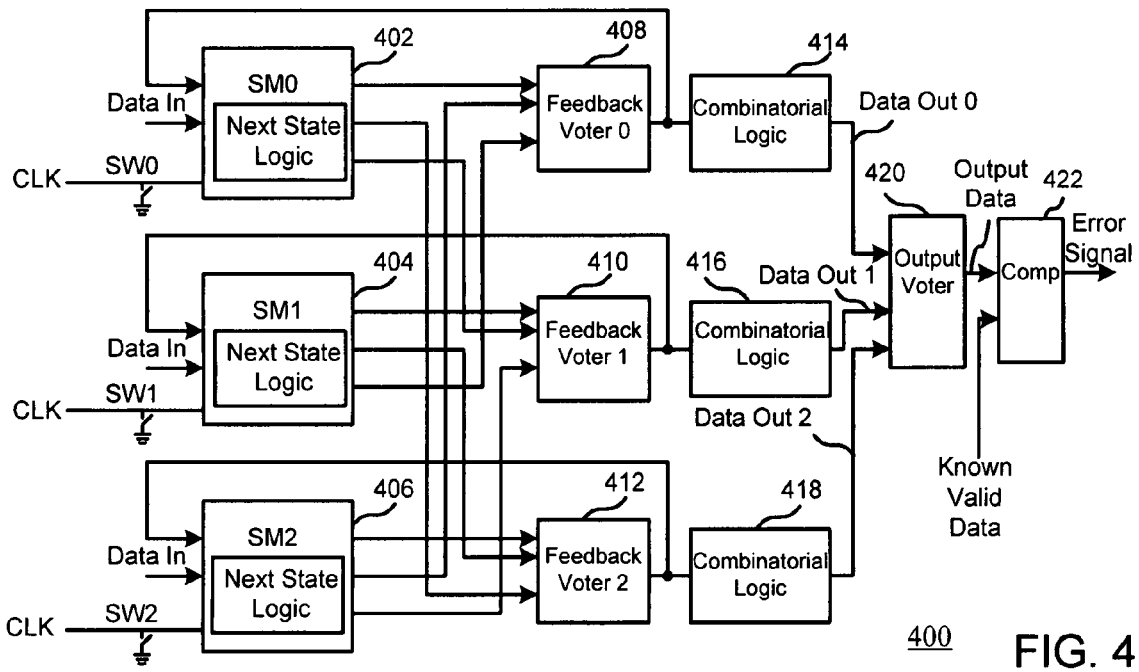
FIG. 4 is a block diagram of a verification circuit for verifying a circuit implemented as a triple module redundant design according to an embodiment of the present invention.

Turning now to FIG. 4, a block diagram of a verification circuit 400 for verifying a circuit implemented as a TMR system according to an embodiment of the present invention is shown. A plurality of logic circuits comprising state machines is provided. In particular, each of the logic circuits 402-406 comprises a redundant circuit and provides an output to a feedback voter. The logic circuit 402 provides an output to a "feedback voter 0" 408, as well as a "feedback voter 1" 410 at the output of the logic circuit 404 and a "feedback voter 2" 412 at the output of the logic circuit 406. The output of feedback voter 408 is coupled to logic circuit 402, as well as combinatorial logic 414 to generate output data (Data Out 0). Similarly, the output of feedback voter 410 is coupled to logic circuit 404, as well as combinatorial logic 416 to generate output data (Data Out 1). Finally, the output of feedback voter 412 is coupled to logic circuit 406, as well as combinatorial logic 418 to generate output data (Data Out 2). Triple module redundancy ensures constant synchronization between redundant state machines by inserting majority voters on all feedback paths, where feedback voter logic passes the majority output of state machines to a state machine feedback path. Output voter 420 passes the majority output of three redundant design domains to generate output data. Therefore, the feedback logic for each state machine is a function of the current state of all three state machines, while output voter 420 is coupled to receive the data outputs of the combinatorial logic and generate output data based upon a majority vote of the output of the feedback voters. The output data is then compared to known valid data (e.g., data comprising expected output data stored in a memory) by a comparator 422. Comparator 422 generates an error signal in the event that the output of the output majority voter does not match the known valid data.

Figure 5:
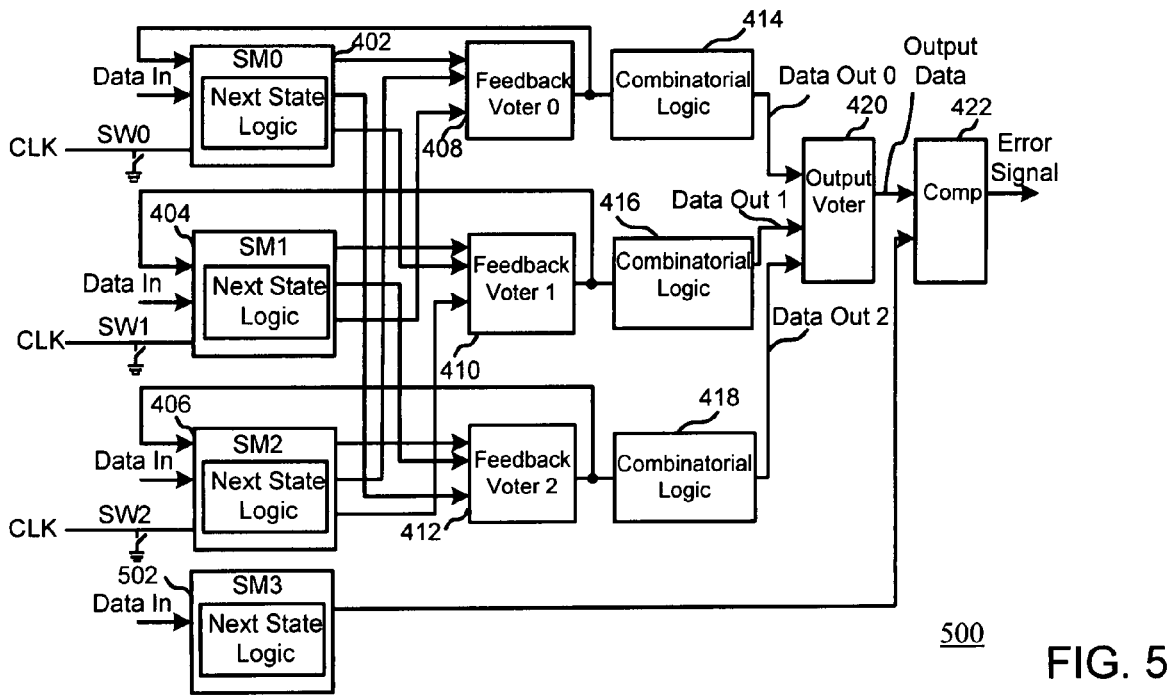
FIG. 5 is a block diagram of a verification circuit for verifying a circuit implemented as a triple module redundant design according to an alternate embodiment of the present invention.

Turning now to FIG. 5, a block diagram of a verification circuit 500 for verifying a circuit implemented as a triple module redundant system according to an alternate embodiment of the present invention is shown. In particular, a known valid data source, such as another logic circuit 502 comprising another redundant circuit, is used in the embodiment of FIG. 5 to enable a comparison of the output of output voter 420. That is, comparator 422 compares the known valid data generated by the additional logic circuit 502 to the output of the output voter. As described above, the output voter will not generate correct data after a second data source is broken when a feedback voter is not working. That is, when a feedback voter is working, the feedback voter will correct the state of the state machine to which it provides feedback. If the feedback voter does not correct the state of a given state machine, the output of the output voter will be incorrect when a second state machine is disabled. The circuit of FIGS. 4 and 5 may be implemented, for example, on a computer implementing a computer-readable storage medium comprising computer-executable code for verifying a design implemented as a triple module redundant design. A specific method of determining whether a certain feedback voter of the three feedback voters is not working will be described in more detail in reference to FIG. 6.

The method of simulating a triple module redundancy design must ensure feedback voting circuitry exists and has been correctly implemented in order to ensure that the circuit is functioning properly. To show correct operation of the feedback voters during simulation, the redundant domains need to be sequentially broken, then fixed, e.g., by tying the clock signal for that domain to ground then connecting it back to the clock source. Specifically, the simulation begins with all of the clocks toggling, where the output should match the expected output. The redundant domains may be sequentially broken using the switches SW0, SW1, and SW2 coupling the clock signal to the logic circuits 402, 404, and 406, respectively. The clock input of one redundant domain is then tied to ground. The output should continue to match the expected output because the output voters are functioning. The clock domain that has been broken is then fixed, e.g., by connecting it back to the clock source before the clock input to a second redundant circuit is coupled to ground. If the output is correct after the clock input to a second redundant circuit is coupled to ground, the feedback voter for the first redundant circuit must be in place and working. If the output is incorrect, there must be a problem with the feedback voter. That is, if the feedback voters are not in place or are not functioning properly, one state machine will be out of sync with the others after breaking the second clock domain, although this will not be revealed until the second clock domain is broken. A detailed description of a method for testing each of the three feedback voters in the circuits of FIGS. 4 and 5 is shown in FIG. 6.

Figure 6:
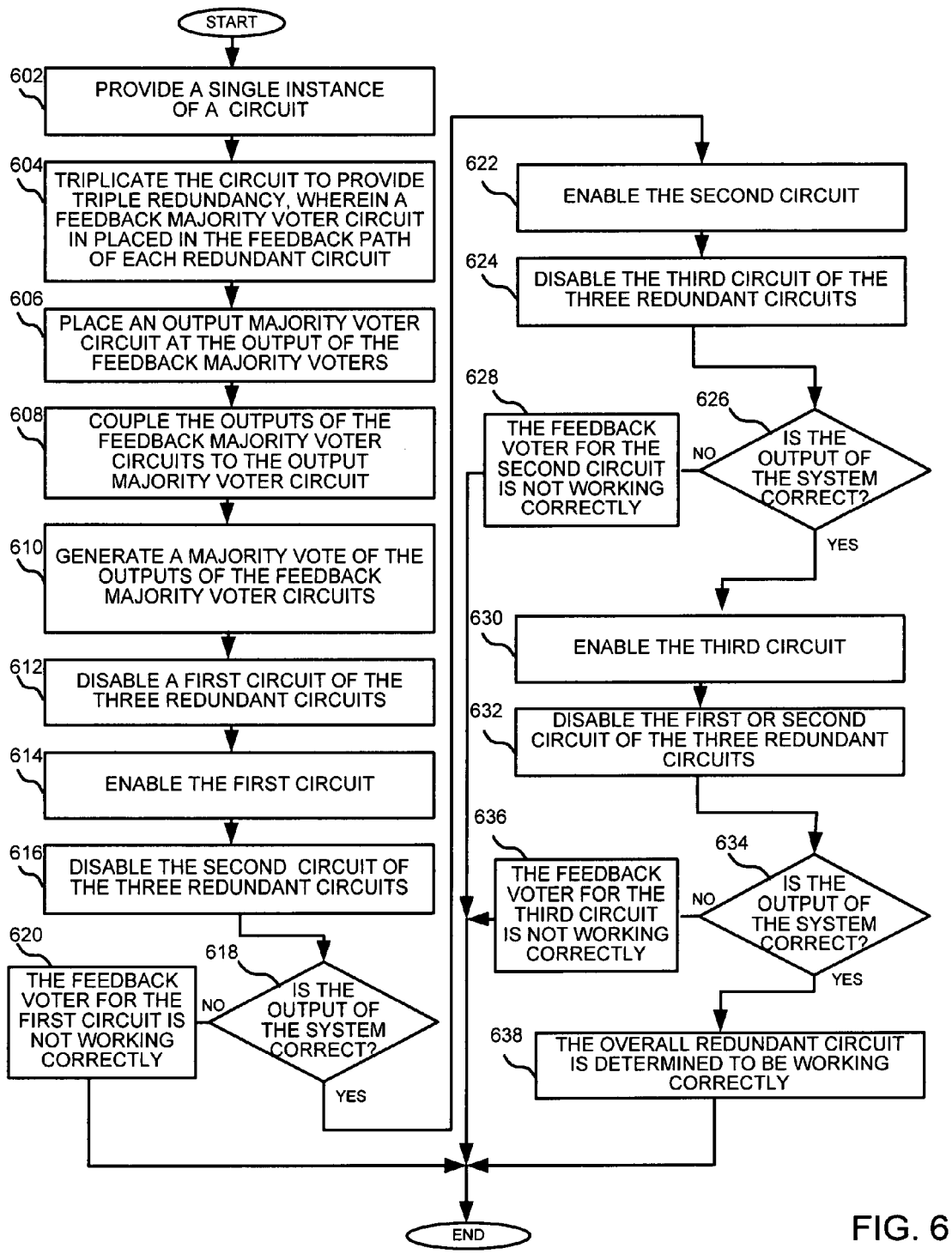
FIG. 6 is a flow diagram showing a method of verifying a circuit implemented as a triple module redundant design according to an embodiment the present invention.

Turning now to FIG. 6, a flow diagram shows a method of verifying a circuit implemented as a triple module redundant design according to an embodiment of the present invention. In particular, a single instance of a circuit is provided at a step 602. The circuit is triplicated to provide triple redundancy, wherein a feedback majority voter circuit in placed in the feedback path of each redundant circuit at a step 604. An output majority voter circuit is placed at the output of each feedback voter circuit at a step 606. The outputs of the feedback majority voter circuits are coupled to the output majority voter circuit at a step 608. A majority vote of the outputs of the feedback voter circuits is generated at a step 610. A first circuit of the three redundant circuits is disabled at a step 612. The first circuit is then enabled at a step 614. That is, the circuit is repaired by the feedback path from the feedback voter to the logic circuit, as shown for example in FIGS. 4 and 5. The second circuit of the three redundant circuits is disabled at a step 616. It is then determined whether the output of the system is correct on the next clock cycle at a step 618. If not, the feedback voter for the first circuit is determined to be not working correctly at a step 620. That is, the feedback circuit should have repaired the state machine on the logic circuit on the next clock cycle. Otherwise, the second circuit is enabled at a step 622. The third circuit of the three redundant circuits is then disabled at a step 624. It is then determined whether the output of the system is correct at a step 626. If not, the feedback voter for the second circuit is determined to be not working correctly at a step 628. Finally, the third circuit is enabled at a step 630, and the first or second circuit of the three redundant circuits is disabled at a step 632. It is then determined whether the output of the system is correct at a step 634. If not, the feedback voter for the third circuit is determined to be not working correctly at a step 636. Otherwise, the overall redundant circuit is determined to be working correctly at a step 638. The method of FIG. 6 may be implemented using any of the circuits of FIGS. 1-5, or some other suitable circuit. Although the method of FIG. 4 shows the verification of feedback voters in a certain order, the verification may be performed in any order.

It can therefore be appreciated that new and novel methods of and systems for verifying a design implemented as a triple module redundant design have been described. The methods of the present invention may be used in conjunction with other verification methods, such as sequentially disabling first and second circuits to determine whether the overall design redundancy and the final stage of output voters are correctly implemented, as described above. It will be appreciated by those skilled in the art that numerous alternatives and equivalents will be seen to exist that incorporate the disclosed invention. As a result, the invention is not to be limited by the foregoing embodiments, but only by the following claims.

What is claimed is:

1. A method of verifying a triple module redundant design, the method comprising:
    providing three circuits and three feedback voter circuits, each of the three circuits comprising a redundant circuit which is simultaneously enabled and coupled to a corresponding feedback voter circuit;
    coupling an output of each circuit of the three circuits to each of the feedback voter circuits;
    disabling a first circuit of the three circuits;
    enabling the first circuit after disabling the first circuit;
    disabling a second circuit of the three circuits after enabling the first circuit; and
    verifying an output of the triple module redundant design after disabling the second circuit to determine whether the triple module redundant design is working correctly.

2. The method of claim 1, wherein verifying the output of the triple module redundant design comprises determining whether there is a defect in a feedback voter circuit corresponding to the first circuit.

3. The method of claim 1, further comprising disabling the second circuit of the three circuits, and then enabling the second circuit.

4. The method of claim 3, further comprising disabling one of the first circuit and a third circuit of the three circuits after enabling the second circuit, and verifying the output of the triple module redundant design to determine whether there is a defect in a feedback voter circuit corresponding to the second circuit.

5. The method of claim 1, further comprising disabling a third circuit of the three circuits, and then enabling the third circuit.

6. The method of claim 5, further comprising disabling one of the first and second circuits of the three circuits after enabling the third circuit, and verifying the output of the triple module redundant design to determine whether there is a defect in a feedback voter circuit corresponding to the third circuit.

7. The method of claim 1, further comprising generating a majority vote of the respective outputs of the three feedback voter circuits.

8. A method of verifying a triple module redundant design, the method comprising:
    coupling each feedback voter circuit of three feedback voter circuits to a corresponding circuit of three circuits comprising redundant circuits which are simultaneously enabled, each feedback voter circuit receiving an output of each of the three circuits;
    disabling a first circuit of the three circuits;
    enabling the first circuit after disabling the first circuit;
    disabling a second circuit of the three circuits after enabling the first circuit;
    coupling an output of each feedback voter circuit to an output voter;
    comparing an output of the output voter to known valid data; and
    verifying an output of the triple module redundant design after disabling the second circuit to determine whether there is a defect in the feedback voter circuit corresponding to the first circuit.

9. The method of claim 8, wherein disabling the first circuit of the three circuits comprises disabling a clock signal to the first circuit.

10. The method of claim 8, further comprising providing a source of the known valid data.

11. The method of claim 8, further comprising disabling a second circuit of the three circuits, and then enabling the second circuit.

12. The method of claim 11, further comprising disabling a third circuit of the three circuits after enabling the second circuit, and verifying the output of the triple module redundant design to determine whether there is a defect in a feedback voter circuit corresponding to the second circuit.

13. The method of claim 12, further comprising enabling the third circuit.

14. The method of claim 13, further comprising disabling one of the first and second circuits of the three circuits after enabling the third circuit, and verifying the output of the triple module redundant design to determine whether there is a defect in a feedback voter circuit corresponding to the third circuit.

15. An article of manufacture, comprising:
   a computer-readable storage medium comprising computer-executable code for verifying a design implemented as a triple module redundant design, the medium comprising:
   code for providing three circuits and three feedback voter circuits, each of the three circuits comprising a redundant circuit which is simultaneously enabled and coupled to a corresponding feedback voter circuit;
   code for coupling an output of each circuit of the three circuits to each of the feedback voter circuits;
   code for disabling a first circuit of the three circuits;
   code for enabling the first circuit after disabling the first circuit;
   code for disabling a second circuit of the three circuits after enabling the first circuit; and
   code for verifying an output of the triple module redundant design after disabling the second circuit to determine whether the triple module redundant design is working correctly.

16. The article of manufacture of claim 15, further comprising code for disabling a second circuit of the three circuits, and then enabling the second circuit.

17. The article of manufacture of claim 16, further comprising code for disabling one of the first circuit and a third circuit of the three circuits after enabling the second circuit, and verifying the output of the triple module redundant design to determine whether there is a defect in a feedback voter circuit corresponding to the second circuit.

18. The article of manufacture of claim 17, further comprising code for disabling a third circuit of the three circuits, and then enabling the third circuit.

19. The article of manufacture of claim 18, further comprising code for disabling one of the first and second circuits of the three circuits after enabling the third circuit, and verifying the output of the triple module redundant design to determine whether there is a defect in a feedback voter circuit corresponding to the third circuit.

20. The article of manufacture of claim 15, further comprising code for generating a majority vote of respective outputs of the three feedback voter circuits.

\* \* \* \* \*